G. R. GEHRANDT.
TURNTABLE.
APPLICATION FILED SEPT. 15, 1919.
1,409,372.
Patented Mar. 14, 1922.
2 SHEETS—SHEET 1.
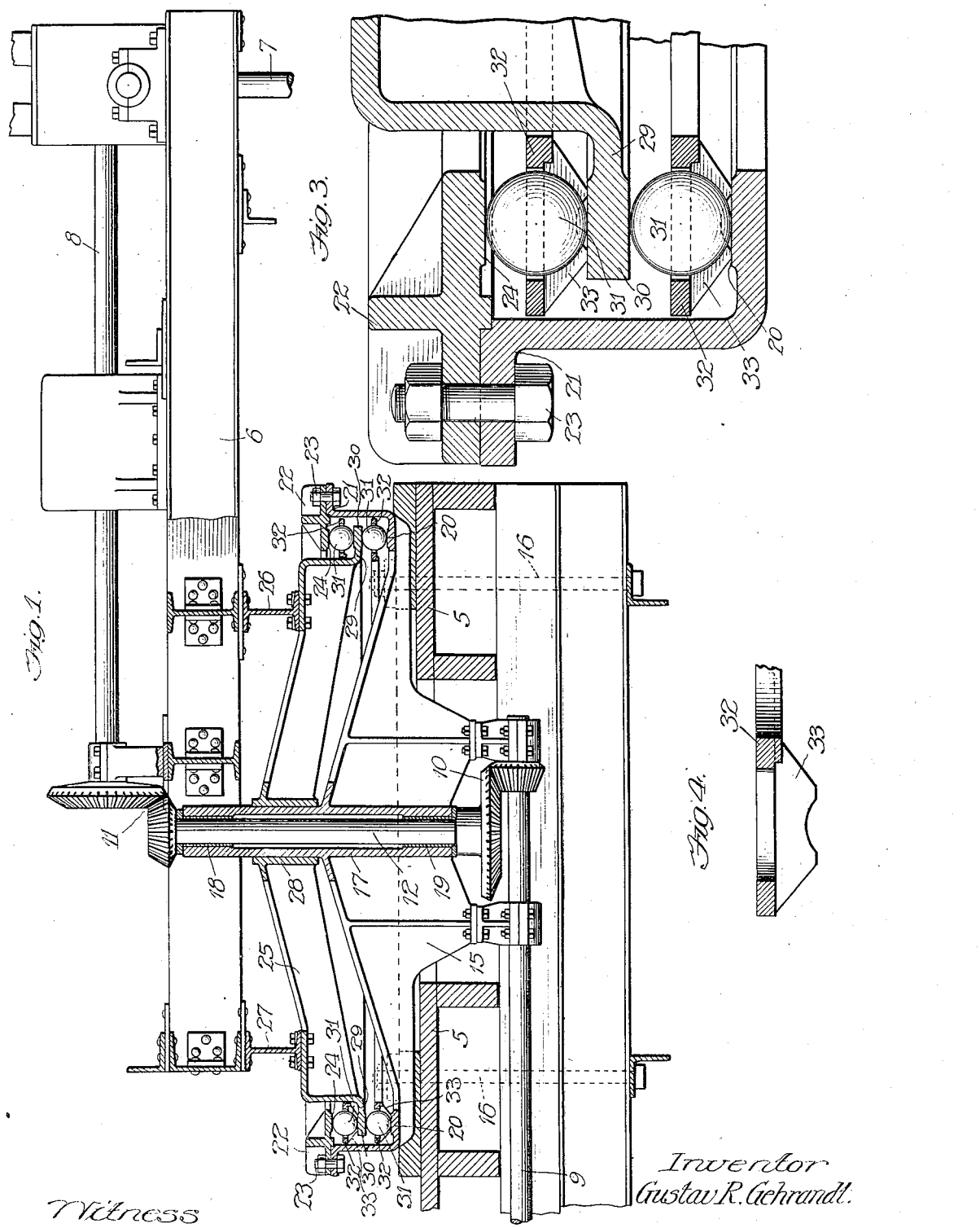
Witness
Martin H. Olsen.
Inventor
Gustav R. Gehrandt.
By Forée Bain & Hinkle
Atty.

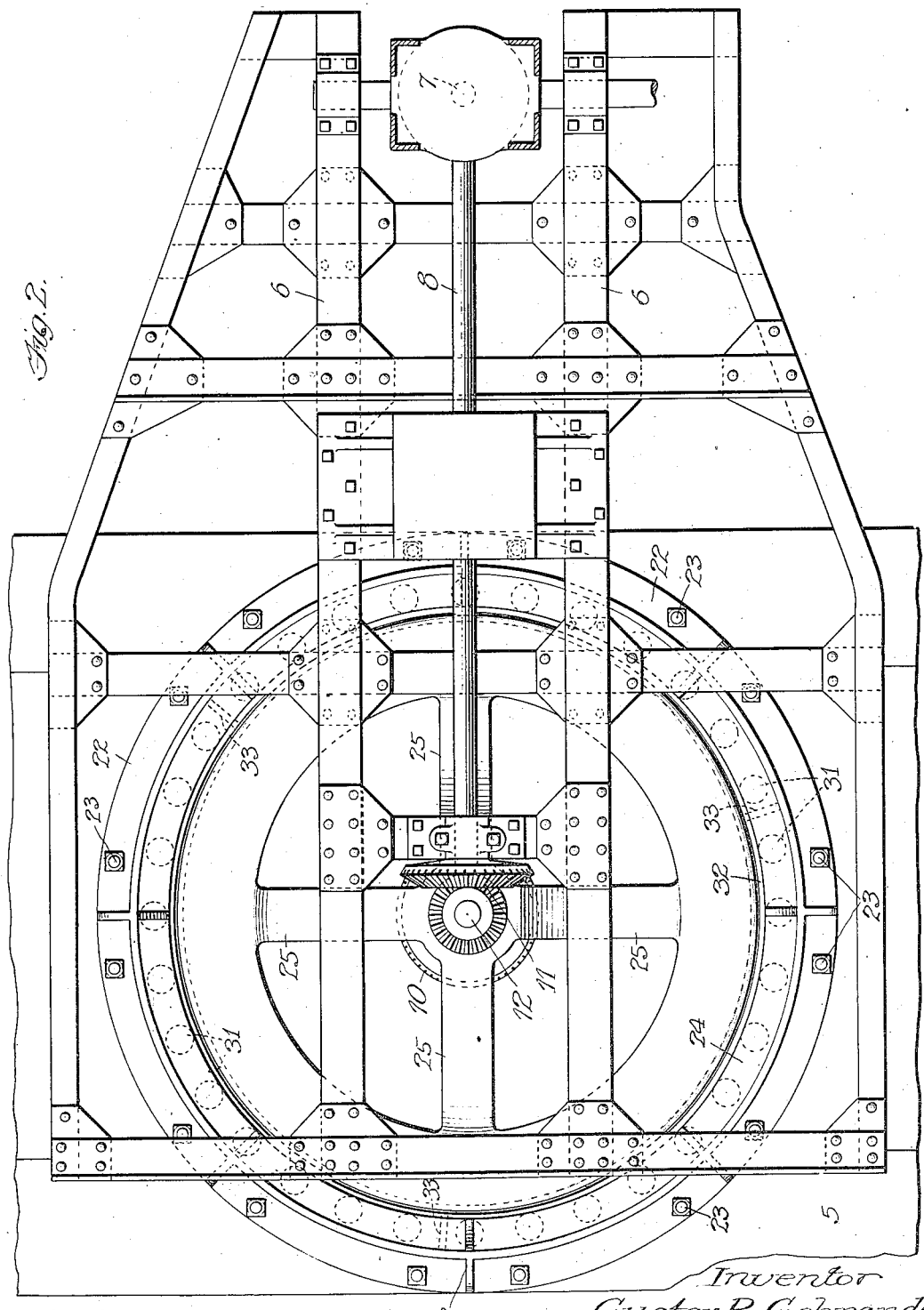

UNITED STATES PATENT OFFICE.

GUSTAV R. GEHRANDT, OF OAK PARK, ILLINOIS, ASSIGNOR TO INTERNATIONAL EARTH-BORING MACHINE CORPORATION, OF CHICAGO, ILLINOIS, A CORPORATION OF DELAWARE.

TURNTABLE.

1,409,372.  Specification of Letters Patent.  Patented Mar. 14, 1922.

Application filed September 15, 1919. Serial No. 323,844.

*To all whom it may concern:*

Be it known that I, GUSTAV R. GEHRANDT, a citizen of Germany, residing at Oak Park, in the county of Cook and State of Illinois, have invented certain new and useful Improvements in Turntables, of which the following is a specification.

This invention relates to turntables.

More particularly, it relates to a turntable for rotatively supporting the frame of machines, such as boring machines, cranes, power shovels, derricks, etc.

Heretofore it has ordinarily been the practice to compensate or balance the overhanging weight of the frame and the material or appliances carried thereby by counterweights located on opposite sides of the axis about which the frame is rotatable. Such counter-balancing is objectionable, particularly in mobile machinery, because of the extra weight which must be transported and the additional size and strength which must be given the parts to support the additional weight. Moreover, the counterbalance, unless cumbersome and objectionable methods of adjustment are employed, is completely effective for only one load, and any unbalance caused by a variation in the load supported or lifted by the frame, or a change in the application or concentration of the load must be taken up by the axial bearings.

An object of the present invention is to provide a turntable which eliminates the above objections.

Another object is to provide a turntable wherein an extending frame carried thereby need not be counter-balanced.

Another object is to provide a turntable which effectively compensates the unbalance of a frame carried thereby.

Another object is to provide an efficient turntable.

Other objects and advantages of the invention will appear from the specification and claims.

An embodiment of the invention is shown in the accompanying drawings in which—

Fig. 1 is a sectional elevation of the turntable.

Fig. 2 is a top plan thereof.

Fig. 3 is an enlarged section through the bearing of the turntable.

Fig. 4 is a section through the ball retaining ring.

The turntable is mounted upon a support 5 and has a rotatable unbalanced frame 6. The support may be mounted upon the frame or body of a vehicle, where the machine is of a mobile type, or upon a suitable foundation, when the machine is of a stationary type. Frame 6 may be of any desired construction, such as a network of angle, channel and I-beams, as shown.

The outer or extending end of frame 6 carries the working appliance of the machine, such for example as a boring tool, a power shovel, hoisting blocks, etc. The drawing illustrates an arrangement for carrying and driving a drill or boring tool, (not shown) through a drill spindle 7. Spindle 7 is driven by suitable gearing from a shaft 8, which receives power from a suitable source, (not shown) through shaft 9, bevel gears 10 and 11, and an intermediate shaft 12. Shaft 12 is the axis about which the frame rotates.

The base of the turntable comprises a spoked wheel-like frame 15 mounted upon support 5 and rigidly secured thereto by suitable means, such as bolts 16. Frame 15 has a hub 17 encircling shaft 12 and equipped with upper bearings 18 and lower bearings 19 in which the shaft rotates. Near its outer edge frame 15 is provided with an annular boss 20 which forms the outer face of a lower ball race for the turntable bearing. The edge of the frame is formed into an upwardly and outwardly extending annular flange 21. To flange 21 the top of the upper ball-race is secured. This top is in the form of a reinforced ring 22 fastened to the flange 21 by suitable means, such as through bolts 23. Ring 22 is provided with a boss 24 whose under side forms the outer face of the upper ball race.

Frame 6 is rigidly mounted upon a wheellike frame 25, by means of I-beams 26 and 27. Frame 25 is provided with a hub 28, having a bearing upon hub 17 and an outwardly extending annular flange 29 which projects between and is spaced from bosses 20 and 24. Flange 29 has an annular boss 30, whose opposite sides form the inner faces of the ball races. Within the ball races, formed respectively by bosses 24 and 30, and 20 and 30, are positioned a number of balls 31. The balls in each race are held in spaced relation to each other and within the race by a ring 32. Ring 32 is provided with an opening for each ball and is held in proper vertical position by a number of downwardly extending lugs 33. Lugs 33 are hollowed out on their undersides so that each rests upon the corresponding lower ball race face upon two comparatively small points. This prevents the scraping of grease from the faces of the ball races.

The balls and their races form bearings upon which the turntable rotates about its axis and bear the load of the rotatable frame and the appliances carried thereby. None of the load is carried by the shaft 12.

When the frame is swung to any position the load is distributed into a downwardly directed force or compression, through beam 26, and an upwardly directed force or tension, through beam 27. These forces are each taken up by anti-friction bearings spaced at considerable distances from the axis of rotation and having active or bearing faces at right angles to the axis. Thus, in the position shown, the downwardly directed force through beam 26 is a compression on the balls in the right hand portion of the lower ball race and a compression on the balls in the left hand portion of the upper ball race. These compressions or the load is transmitted directly to the support on the right hand side of the turntable in the form of a compression and through ring 22, flange 21 and bolt 16 to support 5 on the left hand side of the turntable in the form of a tension. The load is thus distributed or divided into a couple, both components of which are resisted by or conducted to the support.

If the frame is swung to the left the distribution of the load forces is reversed. In this position of the frame the load is distributed to the balls in the left hand portion of the lower ball race and to the balls in the right hand portion of the upper ball race in the form of compression. The compression on the balls at the left is directly communicated to support 5, as a compression, while the compression on the balls at the right in the upper race is communicated to the support as a tension.

In any position to which the frame is swung, there is, therefore, a couple distributing the load to the support on opposite sides of the axis. The load is taken up by comparatively frictionless bearings, whose active faces are spaced some distance from the axis of rotation and at right angles thereto. The unbalance of the frame and its load is therefore compensated for and the frame may be readily moved to any position. Counterweights for the frame and its load are ordinarily unnecessary with this turntable.

Having described my invention, what I claim is:—

1. A turntable having a relatively stationary support, a frame to be rotatably carried by the support, an annular member rigidly secured to the support and having an annular bearing surface, a removable ring secured to the annular member and providing a second annular bearing surface spaced from the first mentioned surface, and a second annular member rigidly carried by the frame and having an annular flange interposed between the bearing surfaces and communicating the load of the frame thereto in the form of counteracting compression and tension.

2. A turntable having a frame, a support therefor, an annular member rigidly carried by the support and having a fixed and removable annular bearing surface spaced apart from each other and both relatively stationary therewith, an annular bearing surface rigidly carried by the frame and interposed between the bearing surfaces of the support, and balls located between the bearing surfaces of the frame and support.

3. A turntable having a support, a shaft supported thereby; a frame journaled on the shaft; and means for relieving the shaft of the load of the frame, said means comprising a pair of annular spaced apart bearing surfaces rigidly carried by the support, and an annular flange carried by the frame and interposed between the bearing surfaces of the support for communicating the load of the frame to the support in the form of a couple.

4. A turntable having a support, a rotatable frame, an annular member rigidly carried by the support and having a pair of parallel annular bearing faces about the axis of the frame, a second annular member rigidly carried by the frame and having a pair of annular bearing faces located between the bearing faces of the first said member to form therewith a pair of ball races, and balls in each race between the respectively cooperating bearing faces of the two annular members.

In testimony whereof I hereunto subscribed my name.

GUSTAV R. GEHRANDT.